No. 692,319. Patented Feb. 4, 1902.
A. W. LIVINGSTON.
SOLDERING MACHINE.
(Application filed Apr. 2, 1901.)
(No Model.) 3 Sheets—Sheet 2.
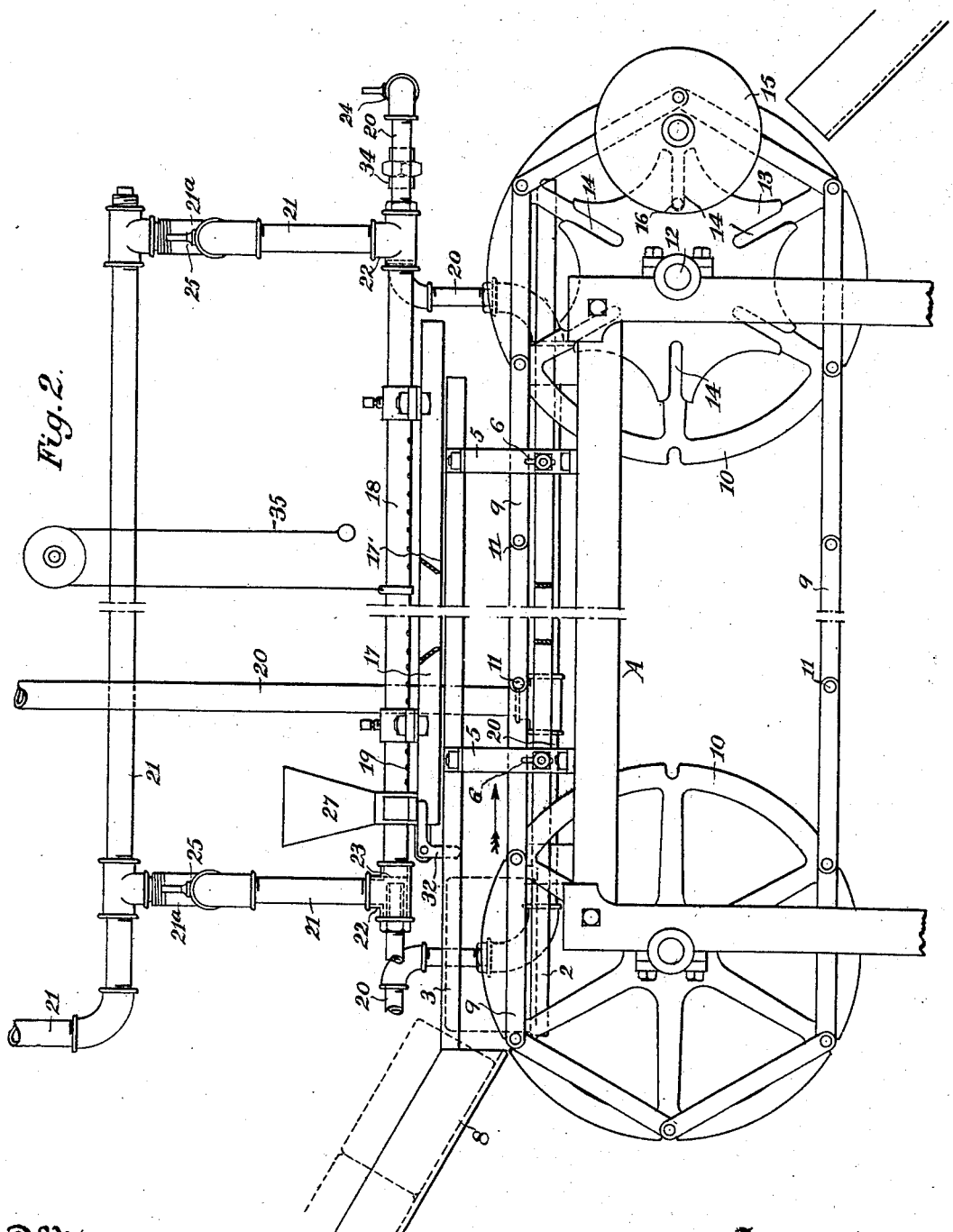
Witnesses,
Inventor,
Andrew W. Livingston
By Dewey Strong & Co.
Attys No. 692,319. Patented Feb. 4, 1902.
A. W. LIVINGSTON.
SOLDERING MACHINE.
(Application filed Apr. 2, 1901.)
(No Model.) 3 Sheets—Sheet 3.
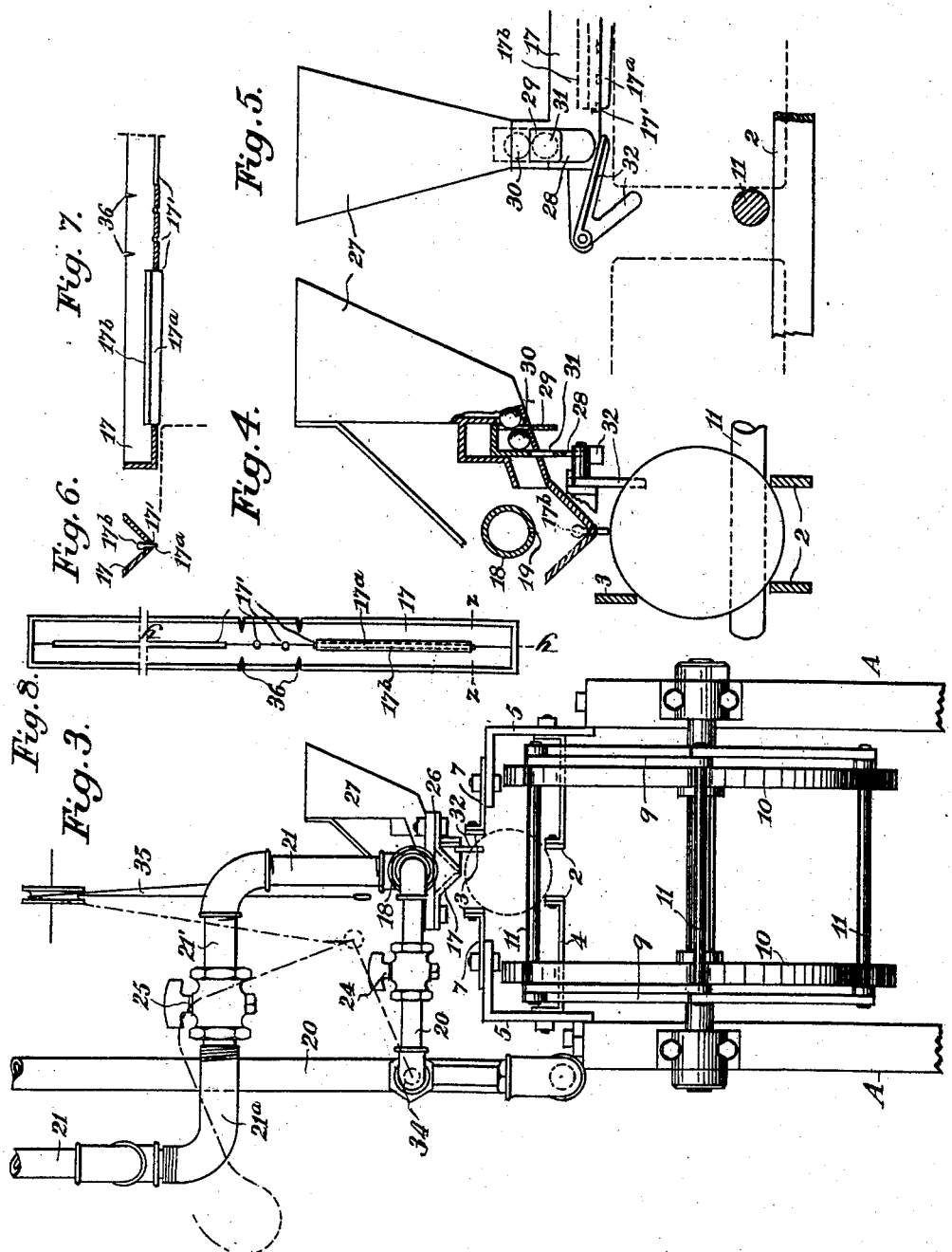
Witnesses
Inventor,
Andrew W. Livingston
By Dewey Strong & Co.
Atty

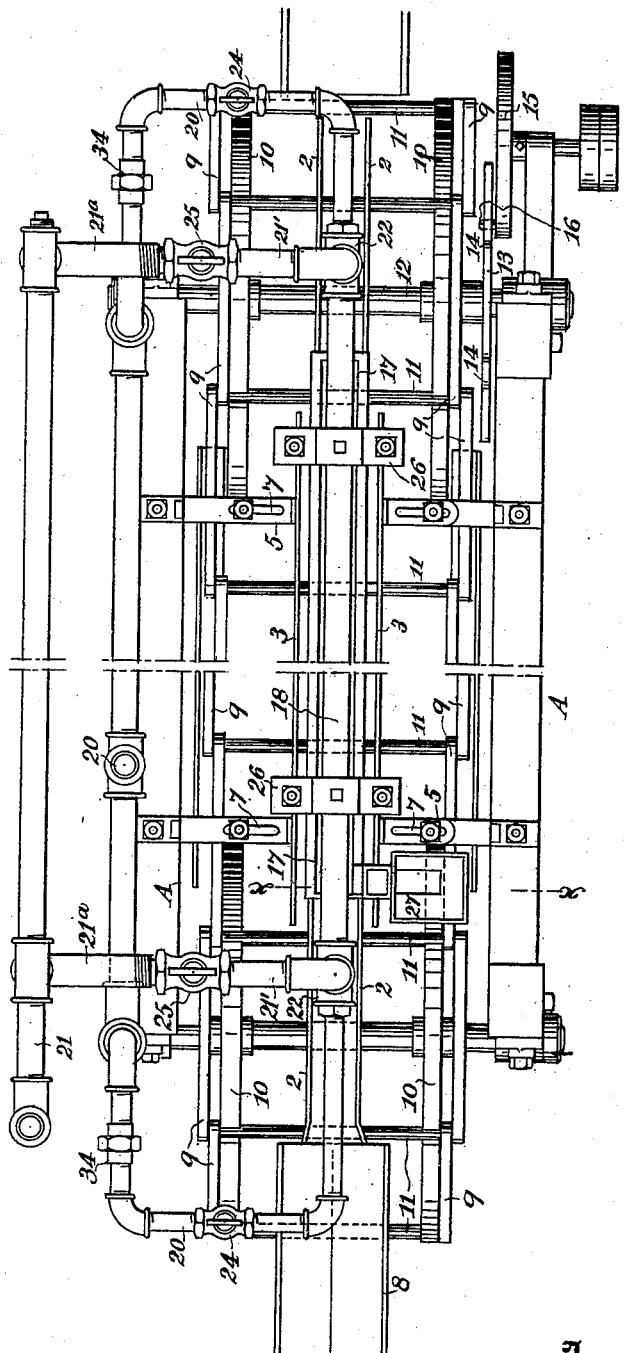

UNITED STATES PATENT OFFICE.

ANDREW W. LIVINGSTON, OF SAN FRANCISCO, CALIFORNIA.

SOLDERING-MACHINE.

SPECIFICATION forming part of Letters Patent No. 692,319, dated February 4, 1902.

Application filed April 2, 1901. Serial No. 54,016. (No model.)

*To all whom it may concern:*

Be it known that I, ANDREW W. LIVINGSTON, a citizen of the United States, residing in the city and county of San Francisco, State of California, have invented an Improvement in Soldering-Machines; and I hereby declare the following to be a full, clear, and exact description of the same.

My invention relates to improvements in machines for soldering the seams of cans when the joining edges of cans form practically a straight line.

It consists of the parts and the constructions and combinations of parts which I shall hereinafter describe and claim.

Figure 1 is a plan of my invention. Fig. 2 is a longitudinal elevation. Fig. 3 is an end elevation. Fig. 4 is an enlarged transverse section on the line $x\,x$ of Fig. 1. Fig. 5 is a side elevation of Fig. 4. Fig. 6 is a transverse section on the line $z\,z$ of Fig. 8. Fig. 7 is a longitudinal section on the line $y\,y$ of Fig. 8. Fig. 8 is a plan view of the solder-bar.

Having reference to the drawings, A represents a suitable framework supporting the mechanism. The cans, with their axes in the line of the direction of travel, are supported in their transmission through the machine between the guides 2 and 3. These guides consist, for reasons of convenience, of angle-iron strips extending longitudinally of the machine and forming a sort of "skeleton trough." The guides are held, respectively, by brackets 4 and 5, and in the guides are slots 6 and 7, respectively, by which the trough may be adjusted to varying sizes of cans.

The cans ready for soldering are delivered into the trough by a suitable feed-chute, as 8. An endless carrier serves to carry the cans forward through the machine. This carrier may consist of the chains 9, passing over sprockets or pulleys 10, and cross-rods 11 unite these chains at distances substantially equivalent to the length of the longest cans to be passed through. Each rod as it comes along strikes against the end of a can in the trough, and so pushes the can forward. The travel of this carrier is preferably intermittent, though I do not wish to limit myself expressly to such movement. Upon the shaft 12, carrying one of the carrier-sprockets, is secured the star-wheel 13, having a slot 14 in each of its radii. A disk 15, suitably mounted and receiving motion from a source of power, is provided with a pin 16, which at each revolution of the disk engages one of the slots 14, rotates the star-wheel, and so causes the carrier to move forward a certain space, equal approximately to the length of a can.

17 represents a solder or sweating bar in horizontal position above and in line with the guide-trough and adapted, preferably, just to clear the can as the latter passes along beneath. This solder-bar is V-shaped, and in its angle it is provided with perforations 17' at suitable intervals. In one of these perforations or slots is an auxiliary solder-bar $17^a$, by which the solder is applied to the can. This solder-bar is in the form of a plate, fitting loosely in said slot, so as to permit the molten solder to flow down and about it and upon its lower projecting edge, which is adapted to come in contact with the passing can and distribute the solder along the seam. A flange portion, as $17^b$, prevents this solder-plate from dropping through the slot.

The modes of first heating this bar and, second, feeding the solder thereto are as follows:

First. A burner is disposed above and parallel with the bar, and consists of a pipe 18, provided with perforations 19 on its under side. These perforations are in line with the perforations in the solder-bar, so that when the gas issuing from the perforations 19 is ignited the flame will blow into and through the perforations 17' in the solder-bar and upon the can-seam beneath. These perforations are, for matters of convenience, separated about an inch and a half. By means of the burner the bar is uniformly heated. A mixture of air and gas is preferably used in the burner 18. The gas and air conduits are respectively represented by pipes 20 and 21, and the mixture takes place in the union 22, a gauze 23 assisting in the thorough commingling. Cocks 24 and 25 control the flow of the mediums. The solder-bar is secured adjustably to the burner by means of the clips 26, so that whenever it is desired to remove the accumulating dirt, scale, &c., in the trough of the bar it can be done by loosening the clips 26 and turning the bar about the burner, thus discharging the contents. The guides 2 and 3 are adjusted so as to bring the seam of the can directly beneath the heated apex of the bar.

Second. As only a limited quantity of solder is desired in the trough or channel of the bar at any one time, I provide the following automatic feed mechanism. The form of the solder used is globular, and each globule or shot is sufficient for a single seam. A quantity of this "shot" solder is placed in a hopper 27. The mouth of this hopper is closed by a suitable gate, which may be operated by the entering can. I have shown the following convenient device: The gate consists of the two members 28 and 29, connected at one end and separated a space about equal to the diameter of a shot. Perforations 30 and 31 are provided, respectively, in the wings or slides 28 and 29 in such fashion that a shot entering the perforation 30 will not escape through the perforation 31 until a can strikes the bell-crank lever 32 and causes the gate to be lifted. The instant the shot strikes the solder-bar it is melted and flows down about the solder-plate, as before stated.

The intermittent action of the carrier is such that as a can is brought against the downwardly-projecting arm of the lever 32 and the latter lifted the can is stopped long enough for the shot to roll into the solder-bar; but the moment the solder starts to flow about the solder-plate the can starts forward and the solder is deposited along the seam by said plate, as described. This can does not stop again until it has passed beyond the perforation and a succeeding can has been brought into position to receive its charge in a similar way. The object of the succeeding perforations in the solder-bar is to submit the can to the flame, so that the solder on the seam may be kept in a molten state and insure the proper distribution of the solder into the joints.

The solder-bar does not come in actual contact with the can; but the heat from the bar and from the flame of the burner is such as to "sweat" the solder into the seams, in contradistinction to the ordinary process of soldering by the pressure of a heated surface.

In order to obviate warping of the solder-bar by reason of the greater heat at the bottom of the trough, I provide notches 36 along the upper edges of the bar, which permits an equable expansion of the bar.

In order that a can may not be "burned" or injured by too long exposure to the heat of the bar, as in case the machine should stop operation for any cause and while cans were still in the guides, I provide a means whereby the burner and bar may be raised free from the cans and out of all dangerous contact therewith.

The pipe-section 20 is provided with a universal joint 34, and the pipe 21 and its continuation 21' are connected by a flexible portion 21$^a$.

By means of a cord 35 within convenient reach of the operator the burner and bar are raised at any time, turning on the parts 34 as a pivot.

The operation of soldering completed, the cans are discharged from the carrier by any desired means.

Having thus described my invention, what I claim as new, and desire to secure by Letters Patent, is—

1. In a soldering-machine, the combination of a can-support and means for moving the cans thereon, a V-shaped solder-bar above and parallel with said support, said bar provided with perforations through which solder is fed, and a burner directing flame-jets through the perforations of the bar.

2. A soldering-machine consisting in combination, of longitudinal guides supporting the can, a V-shaped solder-bar above and parallel with said guides, a burner in conjunction with said bar, perforations in said bar through which solder is fed, and through which flame is directed upon the can-seam beneath, and means by which the can is carried through the machine.

3. The combination in a can-soldering machine of a V-shaped solder-bar having perforations in its bottom, a burner extending parallel with said bar having perforations in line with and corresponding to the perforations in the solder-bar, means by which solder is delivered into the bar, and means whereby a can is made to travel with its seam to be soldered, immediately beneath and in the direction of the length of said bar.

4. In a soldering-machine, the combination with a V-shaped solder-bar having perforations for the discharge of solder, of a burner extending approximately the length of said bar, means whereby a can to be soldered is passed endwise beneath said bar whereby its longitudinal seam is soldered, and means whereby the elevation of said bar and burner above said can may be varied.

5. In a soldering-machine, the combination with a can-support, of a solder-bar horizontal therewith and provided with perforations for the discharge of solder, a burner by which said solder-bar is heated and a flame-jet is directed upon the can-seam beneath, pivotal connections whereby said burner and solder-bar may be simultaneously taken out of or brought into proximity with said can-support.

6. In a soldering-machine, the combination of longitudinal spaced guides, upon which the bottom side of the can is supported, a V-shaped solder-bar above and extending substantially parallel with the guides, and provided with perforations, a perforated burner above and parallel with the solder-bar and adapted to discharge flame-jets through the perforations thereof, and an endless carrier including side chains and transverse connecting-rods adapted to move the cans endwise along the guides.

7. In a soldering-machine, the combination with a support, of a horizontal guide-trough adapted to support a can to be soldered, an intermittently-moving carrier by which said can is carried through said trough, a perforated trough-like solder-bar above said can-trough, and means by which solder is intermittently admitted to said solder-bar simultaneously with the intermittent movement of the carrier.

8. In a soldering-machine, the combination of a V-shaped solder-bar, beneath which but out of actual contact therewith, the can is adapted to travel with its axis parallel with said bar, slotted perforations in the bottom of said bar, a plate movable in one of said slots adapted to have its lower edge protrude slightly beyond said slot, means by which said bar is heated and means for delivering solder into said bar.

9. The combination in a can-soldering machine of a support, a horizontal guide-trough upon which cans to be soldered are supported, means by which said cans are carried through this trough, a solder-bar parallel with and above said trough, a horizontal burner consisting of a perforated pipe by which said bar is heated, and to which said bar is adjustably secured, means whereby solder may be intermittently fed to said solder-bar, and pivotal connections of said burner whereby the bar and burner may be raised clear of cans in said trough.

10. The combination in a can-soldering machine of a support, a horizontal guide-trough, an endless carrier by which cans are conveyed through said trough, means by which this carrier is given an intermittent forward movement, a perforated V-shaped solder-bar parallel with said trough, having its apex portion adapted to be in line with the seam of the can to be soldered, a burner above and parallel with said bar having perforations corresponding to the perforations in said solder-bar, a solder-hopper, a gate controlling the discharge from this hopper, a bell-crank lever engaging the cans in the trough, and connections of this lever and gate whereby the latter is intermittently operated to discharge solder into the solder-bar in unison with the intermittent movement of the carrier.

In witness whereof I have hereunto set my hand.

ANDREW W. LIVINGSTON.

Witnesses:
S. H. NOURSE,
JESSIE C. BRODIE.